Patented Aug. 26, 1947

2,426,485

UNITED STATES PATENT OFFICE 2,426,485

STABILIZING MARINE OILS

Loran O. Buxton, Newark, and Charles E. Dryden, East Orange, N. J., assignors to Nopco Chemical Company, Harrison, N. J., a corporation of New Jersey No Drawing. Application March 27, 1944, Serial No. 528,352

5 Claims. (Cl. 167—81)

1

The present invention relates to the stabilization of fat-soluble vitamin-containing oils. More particularly, the present invention relates to the stabilization of marine oils containing vitamins A and D such as, for example, unrefined fish liver oils.

The present invention is generally applicable to marine oils containing vitamins A and D, unless these oils have been treated or refined in such a manner as to remove all of the antioxidant constituents and particularly those constituents capable of being activated in accordance with the present process. In other words, the present invention is applicable to crude marine oils produced by expressing the oils from fish livers or the like either in the cold or together with heating.

The present invention is also applicable to marine oils which are produced from the fish body or liver by extraction including the use of alkali. Vitamin concentrates which are produced by fractionation from suitable materials such as fish livers and still contain at least a proportion of the natural antioxidants also contain activatable materials which can be activated by treatment according to the present process. Other types of partially refined oils which are produced by saponifying the fatty acids and removing the saponified acids are also suitable for use in accordance with the present invention. All of these various marine oils containing vitamins A and D also contain activatable constituents which may have imparted to them antioxidant properties and when, in the present specification and claims, a marine oil containing vitamins A and D and a constituent capable of being activated by ammonia is referred to, the various vitamin-containing oils as above outlined are intended to be included thereby. Carbon-refined marine oils are not suitable and cannot be activated to any substantial extent by ammonia in accordance with the present specification. Certain other highly refined oils which have had all of the natural antioxidants removed also have had all of the activatable constituents removed and oils of this character cannot have antioxidant properties imparted to them.

Crude oils of the character described are oftentimes used without further refining in order to produce various fish liver oil blends and especially agricultural fish liver oil blends. During the blending of these oils, considerable loss of vitamin A and other valuable constituents of the oil has been encountered due to oxidation during storage or blending. This is particularly true when the oils are blended by being agitated for a considerable time within a relatively large container which is only partially full. The finished oils are also relatively unstable and considerable vitamin loss occurs during further storage and/or shipment.

2

This is true even though crude unrefined fish liver oils contain certain natural antioxidants, as is well known in the art.

The surprising discovery has been made that if fish liver oils of the character described and/or other marine oils containing vitamins A and D are treated with a relatively small amount of ammonia, the losses from oxidation are greatly decreased. This may be due to the production of new antioxidants within the crude fish liver and other oils by the action of the ammonia thereon, although it is not desired that the present invention be limited to such theory.

It is one of the objects of the present invention, therefore, to stabilize marine oils containing vitamins A and D against oxidation.

A second object of the present invention is a process for the stabilization of marine oils containing vitamins A and D and activatable constituents by reacting therewith a relatively small amount of ammonia.

A third object of the present invention is to stabilize marine oils containing vitamins A and D and activatable constituents by reacting therewith a relatively small amount of ammonia in the presence of a solvent for the marine oil.

A fourth object of the present invention is a new stabilized marine oil containing vitamins A and D which is produced by the reaction of ammonia on the marine oil.

Other objects and advantages of the present invention will become apparent from the subsequent specification and claims.

The present invention is applicable to various types of marine oils such as those extracted from various fish such as sardine, menhaden, herring and similar fish. In particular, the present invention is applicable to the stabilization of crude and partly refined oils containing constituents activatable by ammonia obtained by various standard methods of extraction from fish livers such as the livers of cod, ling cod, halibut, tuna, mackerel, shark, swordfish, etc. All of these oils are marine oils which contain varying quantities of vitamins A and D.

In practicing the present process, the crude fish liver oil may be treated with a concentrated aqueous ammonium hydroxide solution and heated to any suitable temperature for a time sufficient to develop antioxidants within the solution under refluxing conditions although, in some instances, favorable results may be obtained by the simple admixture of the crude oil with the concentrated ammonium hydroxide solution. In place of the concentrated ammonium hydroxide and aqueous solution, anhydrous ammonia may be used or liquid ammonia under pressure, and when in the claims and description, the term "ammonia" is used, all of these various forms of ammonia are intended. In any event, the amount of ammonia used is substantially less than the amount of marine oil and may be spoken of as a relatively small amount. In general, the quantity of ammonia may vary from approximately 1% to 10% of concentrated aqueous ammonium hydroxide solution by weight as compared to the weight of the marine or fish liver oil.

In general it has been found desirable to dissolve the fish liver oil at least partially in a suitable solvent therefor. Thus the crude fish liver oil may be dissolved in a hydrocarbon or halogenated hydrocarbon solvent such as hexane, heptane, octane, ethylene dichloride, trichlorethylene, carbon tetrachloride, cyclohexane, methylcyclohexane or benzene. A particularly desirable solvent for dissolving the fish liver oil is acetone. The amount of solvent employed should be at least equivalent to, and in some cases in excess of, the amount of marine oil being treated. Mixtures of solvents for the fish liver oil may also be used.

The following examples are intended to illustrate the invention without in any way limiting the same.

*Example I*

Twenty-five grams of crude shark liver oil were heated with 100 ml. of acetone and 1 ml. of concentrated ammonium hydroxide under reflux conditions for a period of one hour. Thereafter, the oil was heated under reduced pressure for sufficient time to remove the water, acetone, and ammonia. The following results were obtained:

|   |   | Per cent A destruction at 34.5° C. after— | | | |
|---|---|---|---|---|---|
|   |   | 6 days | 14 days | 20 days | 27 days |
| 1 | Crude shark liver oil | 8.9 | 26.8 | 42.8 | |
| 2 | Crude shark liver oil heated with 4% conc'd. NH$_4$OH, 1 hr. (Ex. I) | 2.68 | 2.68 | 2.68 | 2.68 |

It will be noted from the above table that at the end of 20 days, a sample of the crude shark liver oil, when heated to 34.5° C. lost 42.8% of vitamin A; whereas the same oil after treatment with 4% concentrated ammonium hydroxide in the presence of acetone as above outlined lost only 2.68% of its vitamin A content when tested under precisely similar conditions for 27 days.

*Example II*

A mixture of 50 grams of crude halibut liver oil and 1% of concentrated ammonium hydroxide was heated at 60° C. with occasional shaking for one hour. The oil was then heated under reduced pressure for sufficient time to remove the water and ammonia. The following results were obtained when the crude halibut liver oil and the treated sample were maintained at 34.5° C.

|   |   | Per cent A destruction at 34.5° C. after— | | |
|---|---|---|---|---|
|   |   | 6 days | 14 days | 20 days |
| 1 | Crude halibut liver oil | 8.79 | 28.5 | 58.3 |
| 2 | Crude halibut liver oil heated with 1% conc'd. NH$_4$OH, 1 hr. (Ex. II) | 3.55 | 16.3 | 27.1 |

*Example III*

A mixture of 25 grams of crude shark liver oil and 1% of concentrated ammonium hydroxide was heated at 60° C. with occasional shaking for one hour. The oil was then heated under reduced pressure for sufficient time to remove the water and ammonia. The following results were obtained.

|   |   | Per cent A destruction at 34.5° C. after— | | |
|---|---|---|---|---|
|   |   | 6 days | 14 days | 20 days |
| 1 | Crude shark liver oil | 10.1 | 31.4 | 47.6 |
| 2 | Crude shark liver oil heated with 1% conc'd. NH$_4$OH, 1 hr. (Ex. III) | 6.51 | 19.3 | 29.6 |

*Example IV*

A second sample of the crude shark liver oil in Example III was treated in an identical manner as that outlined, except that prior to the heating with concentrated ammonium hydroxide, 100 ml. of acetone were added. The following results were obtained:

|   |   | Per cent A destruction at 34.5° C. after— | | |
|---|---|---|---|---|
|   |   | 6 days | 14 days | 20 days |
| 1 | Crude shark liver oil of Ex. IV | 7.0 | 16.7 | 24.1 |

*Example V*

To a second sample of the halibut liver oil of Example II, 100 ml. of acetone were added prior to the treatment with concentrated ammonium hydroxide as outlined in Example II. The following results were obtained.

|   |   | Per cent A destruction at 34.5° C. after— | | |
|---|---|---|---|---|
|   |   | 6 days | 14 days | 20 days |
| 1 | Crude halibut liver oil of Ex. V | 6.53 | 13.6 | 20.6 |

*Example VI*

A third sample of the halibut liver oil of Example II was treated precisely as in Example V, except that 5% of concentrated ammonium hydroxide solution was used. The following results were obtained:

|   |   | Per cent A destruction at 34.5° C. after— | | |
|---|---|---|---|---|
|   |   | 6 days | 14 days | 20 days |
| 1 | Crude halibut liver oil of Example VI | 5.5 | 18.0 | 28.2 |

It will be noted from the above table that although the oil was much more stable than the original sample, the use of this additional quantity of ammonia did not improve the characteristics of the oil as compared to Example V.

*Example VII*

Another sample of shark liver oil of Example III was treated precisely as in Example IV, except that 5% ammonium hydroxide was used. The following results were obtained.

|   |   | Per cent A destruction at 34.5° C. after— | | |
|---|---|---|---|---|
|   |   | 6 days | 14 days | 20 days |
| 1 | Crude shark liver oil of Example VII | 8.6 | 18.8 | 33.2 |

The expression "rendered" is employed in the claims to connote an oil which has been separated from its source, i. e., in this case from fish or fish livers.

Having described our invention, what we claim as new and desire to be secured by Letters Patent is:

1. A process for increasing the stability of a rendered fat-soluble vitamin-containing marine oil containing natural antioxidants normally associated therewith, which comprises heating an organic solvent solution of such an oil in contact with concentrated ammonium hydroxide and subsequently freeing the oil of ammonia, water and solvent by heating the mass under reduced pressure.

2. A process for increasing the stability of a rendered crude fish liver oil, which comprises heating an organic solvent solution of such an oil in contact with concentrated ammonium hydroxide and subsequently freeing the oil of ammonia, water and solvent by heating the mass under reduced pressure.

3. A process for increasing the stability of a rendered fat-soluble vitamin-containing marine oil containing natural antioxidants normally associated therewith, which comprises heating an acetone solution of such an oil in contact with concentrated ammonium hydroxide and subsequently freeing the oil of ammonia, water and acetone by heating the mass under reduced pressure.

4. A process for increasing the stability of a rendered crude fish liver oil, which comprises heating an acetone solution of such an oil in contact with concentrated ammonium hydroxide and subsequently freeing the oil of ammonia, water and acetone by heating the mass under reduced pressure.

5. A process for increasing the stability of a rendered crude fish liver oil, which comprises refluxing an acetone solution of such an oil admixed with 1% to 10% of concentrated ammonium hydroxide based on the weight of the oil and subsequently freeing the oil of ammonia, water and acetone by heating the mass under reduced pressure.

LORAN O. BUXTON.
CHARLES E. DRYDEN.

REFERENCES CITED

The following references are of record in the file of this patent:

UNITED STATES PATENTS

| Number    | Name     | Date          |
|-----------|----------|---------------|
| 2,156,985 | Hempel   | May 2, 1939   |
| 2,303,740 | Hempel   | Dec. 1, 1942  |
| 1,909,069 | Orelup   | May 16, 1933  |
| 2,126,268 | McGavack | Aug. 9, 1938  |
| 2,044,800 | Major    | June 23, 1936 |
| 2,394,968 | Van Orden| Feb. 12, 1946 |

OTHER REFERENCES

Cady et al., Journal of Biological Chemistry, vol. 86 (1930), page 749. (Copy in S. L.)